United States Patent

[11] 3,634,842

| [72] | Inventor | Karl O. Niedermeyer<br>17W068, Bensenville, Ill. 60106 |
|---|---|---|
| [21] | Appl. No. | 26,918 |
| [22] | Filed | Apr. 9, 1970 |
| [45] | Patented | Jan. 11, 1972 |

[54] EMERGENCY SUMP PUMP APPARATUS
9 Claims, 1 Drawing Fig.

[52] U.S. Cl. ..................................................... 340/244
[51] Int. Cl. ..................................................... G08b 7/00
[50] Field of Search ........................................... 340/244,
333, 280, 256; 200/84

[56] References Cited
UNITED STATES PATENTS

| 1,556,838 | 10/1925 | Jensen | 340/244 A |
| 2,816,973 | 12/1957 | Beck et al. | 340/244 B |
| 3,264,627 | 8/1966 | Austin | 340/244 A |
| 2,053,353 | 9/1936 | Talbot | 340/244 A |
| 3,287,175 | 11/1966 | Teed | 340/244 |
| 3,310,795 | 3/1967 | David | 340/244 A |
| 2,996,652 | 8/1961 | Cassell | 340/333 |
| 3,384,886 | 5/1968 | Serra | 340/333 |
| 3,289,194 | 11/1966 | King | 340/280 |

Primary Examiner—John W. Caldwell
Assistant Examiner—H. Samuel Cohen
Attorney—Darbo, Robertson & Vandenburgh

ABSTRACT: A float switch in a sump controls the energizing of a battery-operated sump pump regardless of the condition of the normal source of power (alternating current). The apparatus is plugged into the normal source of alternating current and provides regulated charging for the battery. An alarm is activated when the normal source of power is not present, when the battery needs electrolyte, and when the sump pump is turned on.

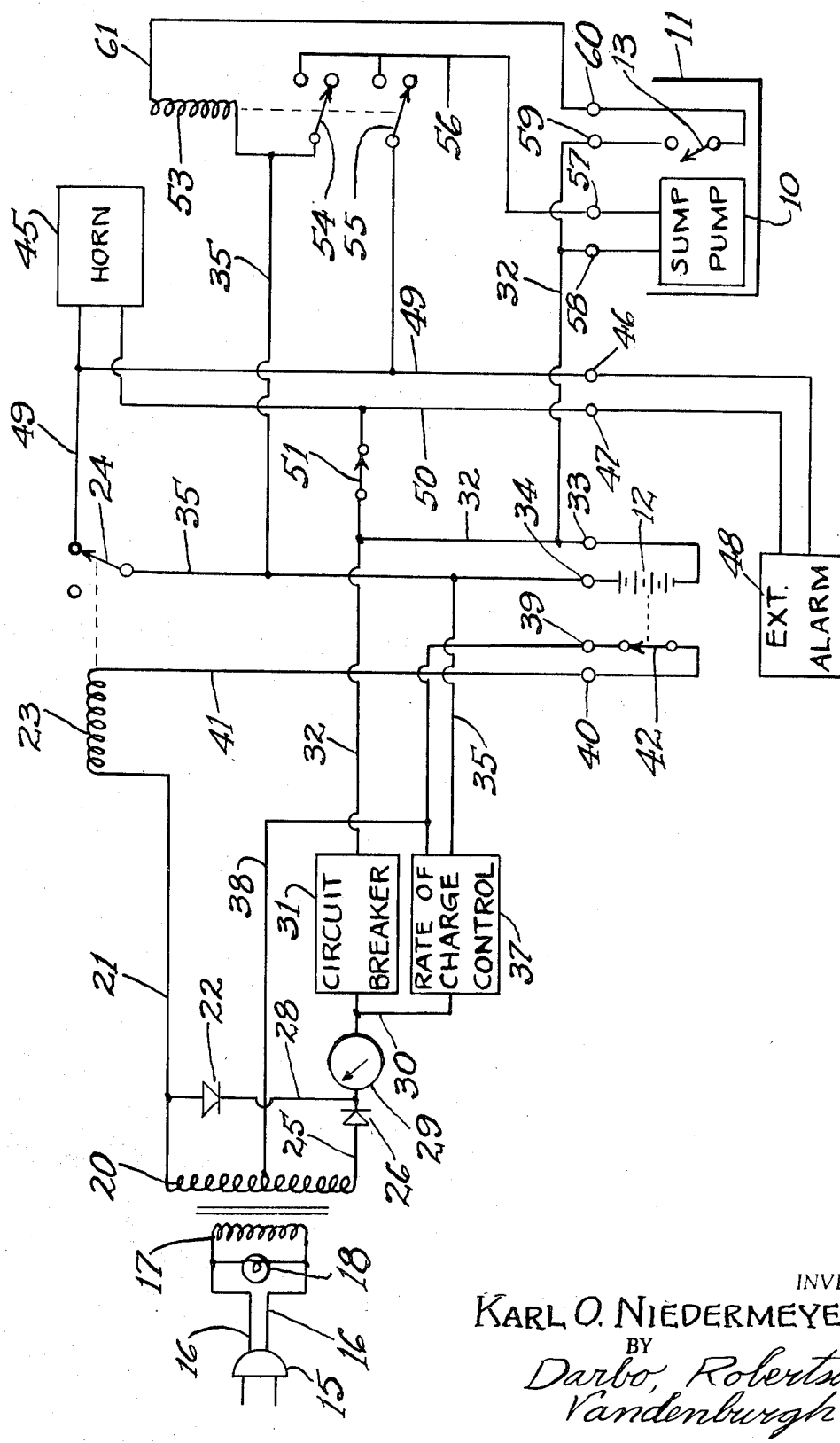

EMERGENCY SUMP PUMP APPARATUS

BACKGROUND AND SUMMARY OF THE INVENTION

Many areas and locations, because of their location or other factors, require the existence of a sump from which undesired liquid may be drawn for discharge. The sump pumps for withdrawing and discharging such liquids normally are operated from the regular source of alternating current employed in the area. This is fine so long as nothing goes wrong; the principal item that often goes wrong to cause difficulty being a failure of the electric power. This often accompanies conditions which call for a need of a sump pump. For example, a heavy storm which will produce excess water which must be pumped away often will knock out the electric line and thus cause an interruption of the electric service which will make the sump pump inoperable.

The principal object of the present invention is to provide an emergency or standby protection to a sump pump locality in a "package" which requires as little attention and service as possible; yet which will be ready for service unless the user has been warned otherwise. A battery-operated pump is employed and a battery is used which is kept charged by a charger operated by the normal source of electric power. Such rechargeable (wet) batteries periodically require the addition of water to the cells. An alarm is incorporated to warn the user if the liquid level in the battery is getting low. The same alarm also sounds in the event of power failure from the normal source of electric power. The sump pump is activated through a float switch in the sump. This is the only effective control for the sump pump motor and, when the source of power has failed, the sump pump motor will only be turned on at the dictates of the sump float switch. The failure of power will not in and of itself result in any action other than the sounding of the alarm.

DESCRIPTION OF THE DRAWING

The FIGURE of the drawing is a schematic illustration of an embodiment of the invention.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

A battery-operated sump pump, generally 10, is mounted in a sump 11 from which liquids are to be withdrawn for discharge. Pump 10 includes an electrically operated motor (not separately shown) suitable for operation by a storage battery 12. For example, the motor and battery 12 both are 12 volts, direct current rating. A float switch 13 is of a type which is normally open. That is, it is open when there is no water in the sump to be withdrawn. However, when the water level in the sump 11 arises to an unsatisfactory degree, the float switch 13 closes.

The control unit is adapted to be connected to the ordinary alternating current house circuit, as indicated by the plug 15. Wires 16 connect plug 15 to the primary 17 of a transformer. A neon signal light 18 is connected in parallel with primary 17 so as to be energized so long as power is present.

The transformer secondary 20 is a center tapped winding. The windings 17 and 20 are proportioned so that 12 volts AC is produced in the secondary at each side of the center tap. A wire 21 connects one end of the winding 20 with a rectifier 22 and with one end of a solenoid 23 of a relay which includes a switch 24. Switch 24 is normally closed and is opened when the solenoid 23 is energized. The other end of secondary 20 is connected by a wire 25 to a rectifier 26.

A wire 28 connects the two rectifiers 22 and 26 to an ammeter 29, which indicates the rate of charge. A wire 30 connects the other side of the ammeter 29 to an overload circuit breaker 31 and to rate-of-charge control 37. A wire 32 connects the circuit breaker to terminal 33 for the battery 12. The other terminal 34 for the battery is connected to a wire 35 which goes to switch 24 and to a rate-of-charge control 37. The center tap for the secondary 20 is connected to a wire 38, also connected to the rate-of-charge control, and internally of the control to wire 35. This internal connection, for example, is through a silicon-controlled rectifier by which the rate of charge is varied in relation to the extent of charge of the battery. Within the battery is a float switch 42, which is normally closed and which opens when the level of electrolyte in the battery drops below a desired level. Switch 42 is connected to a pair of terminals 39 and 40. A wire 41 connects terminal 40 to the other end of solenoid 23. Terminal 39 is connected to wire 38.

An internal horn 45 is provided for producing a sensible signal. This horn is connected in parallel with a pair of terminals 46 and 47 to which an external alarm 48 may be connected, if desired. A wire 49 connects the horn to terminal 46 and to switch 24. A wire 50 connects the horn to terminal 47 and to a switch 51. Switch 51 also connects to wire 32. It is employed to silence both horn 45 and alarm 48, if desired. That is, when switch 51 is open, neither horn 45 nor alarm 48 will sound. Preferably, switch 51 is spring biased to the closed position so that it cannot be inadvertently left open.

A second relay comprises a solenoid 53 and two switches 54 and 55. Both switches 54 and 55 are normally open and are closed upon solenoid 53 being energized. Wire 35 connects both to solenoid 53 and to switch 54. Wire 49 connects to switch 55. A wire 56 connects switches 54 and 55 to a terminal 57. Terminal 57 is one of the two terminals for sump pump 10, the other being terminal 58 connected to wire 32. Wire 32 also connects to terminal 59 for switch 13. The other terminal 60 for switch 13 is connected by a wire 61 to solenoid 53.

Assuming that the apparatus is plugged in so that the transformer primary 17 is being supplied with electric power (alternating current), the two rectifiers 22 and 26 (along with the secondary 20) serve as a full-wave rectifier to supply 12 volt direct current (through the circuit breaker and rate of charge control) to battery 12. Solenoid 23 is a 12-volt (alternating current) coil and is energized from one side of secondary 20 so that switch 24 is in the open position. Similarly, since switch 13 is in the open position, the relay coil 53 is not energized and switches 54 and 55 are open. In this condition the horn 45 is silent. Should there be a failure of electrical power from the alternating current source, relay coil 23 will be deenergized permitting switch 24 to move to the position illustrated in the drawing. In this position, the horn 45 is energized through switch 24 by battery 12. The circuit for horn 45 is terminal 34, wire 35, switch 24, the horn, wire 50, switch 51, wire 32, terminal 33 and battery 12.

Similarly, if the electrolyte in battery 12 becomes low, switch 42 opens to break the circuit through which solenoid 23 is energized. Again, the release of solenoid 23 allows switch 24 to close and sounds horn 45. It is important to note that in neither of these events will relay solenoid 53 become energized. That is, solenoid 53 is energized from battery 12 so that it reacts independently of the status of electrical power from the alternating current source. This is important because the failure of electrical power does not result in the energizing of the motor of sump pump 10.

In the event that the liquid in the sump 11 rises to a level such that it should be discharged (such as by reason of failure of the main sump pump, not shown) the switch 13 will close. Switch 13 energizes solenoid 53 through a circuit comprising terminal 33, wire 32, terminal 59, switch 13, terminal 60, wire 61, solenoid 53, wire 35, terminal 34 and battery 12. With solenoid 53 energized, switches 54 and 55 close. In this position, there is a circuit from battery 12 through sump pump 10.

This circuit is terminal 33, wire 32, terminal 58, sump pump 10, terminal 57, wire 56, switch 54, wire 35, terminal 34 and battery 12. Also, there is a circuit to horn 45 through switch 55. This circuit is terminal 33, wire 32, switch 51, wire 50, horn 45, wire 49, switch 55, switch 54, wire 35, terminal 34 and battery 12. The horn 45 will sound unless switch 51 is opened. It also will be silenced by the opening of switch 13 to open relay contacts 54, 55. Sump pump 10 will continue to run until switch 13 opens.

I claim:

1. An apparatus for use with a drainage sump and a source of alternating current, said apparatus including:
    a sump pump having an electric motor suitable for battery operation, said pump being adapted for use in connection with said sump;
    a rechargeable battery for said motor;
    charging means adapted to be connected to said source and connected to said battery for charging the battery;
    float switch means for said sump providing a closed connection with an excessive amount of liquid in the sump and otherwise an open connection;
    a relay having a solenoid and normally open contact means which are closed when said solenoid is energized;
    first circuit means connecting said float switch means, said battery and said solenoid in series to energize said solenoid when there is a closed connection at said float switch means; and
    second circuit means connecting said contact means, said battery and motor in series to energize said motor with said contact means in the closed position.

2. An apparatus as set forth in claim 1, including:
    electric signalling means for producing a sensible signal; and
    third circuit means connecting said signalling means, said battery and said contact means in series for energizing said signalling means with said contact means in the closed position.

3. An apparatus as set forth in claim 2, including means for detecting when said apparatus is not receiving power from said source, said third circuit means connecting said battery and said detecting means in series with said signalling means for energizing said signalling means when apparatus is not receiving power from said source.

4. An apparatus as set forth in claim 3, wherein said third circuit means includes a manually operable, normally closed switch in said series circuits for opening said series circuits and deenergizing said signalling means.

5. An apparatus as set forth in claim 4, wherein said battery includes an electrolyte bath, said apparatus including an electrolyte level switch in said bath, said level switch being actuated upon the electrolyte dropping below a given level in the bath, said detecting means including said level switch for actuating said detecting means and thereby energizing said signalling means when said level switch is actuated.

6. An apparatus as set forth in claim 5, wherein the level switch is closed when the electrolyte is above the given level and opens when the electrolyte drops below said level;
    said detecting means includes a second relay which has normally closed contacts which are opened when the relay is energized;
    said second circuit mean forming a series circuit with the battery, the normally closed contacts of the second relay and the signalling means;
    said charging means including a transformer having a primary adapted to be connected to said source and a secondary; and
    said detecting means includes third circuit means connecting said secondary, the second relay and said level switch in series.

7. An apparatus as set forth in claim 1, wherein said battery includes an electrolyte bath, said apparatus including an electrolyte level switch in said bath, said level switch being actuated upon the electrolyte dropping below a given level in the bath,
    said apparatus including electric signalling means and third circuit means connecting said level switch, said battery and said signalling means for energizing said signalling means when said level switch is actuated.

8. An apparatus as set forth in claim 7, wherein
    the level switch is closed when the electrolyte is above the given level and opens when the electrolyte drops below said level;
    a relay which has normally closed contacts which are opened when the relay is energized;
    said third circuit means forming a series circuit with the battery, the normally closed contacts and the signalling means;
    charging means including a transformer having a primary adapted to be connected to said source and a secondary; and
    circuit means connecting said secondary, said solenoid of said relay and said level switch in series.

9. An apparatus as set forth in claim 1, including means for detecting when said apparatus is not receiving power from said source, signalling means, and circuit means connecting said battery and said detecting means in series with said signalling means for energizing said signalling means when apparatus is not receiving power from said source.

* * * * *